United States Patent [19]

Molitor

[11] Patent Number: 5,209,333
[45] Date of Patent: May 11, 1993

[54] TOOTH PITCH DEVIATION SHIFT MECHANISM FOR A GEARBOX

[75] Inventor: Martin Molitor, Esslingen, Fed. Rep. of Germany

[73] Assignee: Mercedes-Benz AG, Fed. Rep. of Germany

[21] Appl. No.: 858,529

[22] Filed: Mar. 27, 1992

[30] Foreign Application Priority Data

Mar. 27, 1991 [DE] Fed. Rep. of Germany ....... 4110013

[51] Int. Cl.$^5$ ............................ F16D 23/02; B23F 1/04
[52] U.S. Cl. .................................... 192/67 R; 192/108
[58] Field of Search .................... 192/67 R, 108, 53 B; 74/374, 375

[56] References Cited

U.S. PATENT DOCUMENTS

| 2,070,140 | 2/1937 | Peterson et al. | 192/67 R |
|---|---|---|---|
| 2,613,781 | 10/1952 | Polomski et al. | 192/67 R |
| 2,654,456 | 10/1953 | Wildhaber | 192/67 R |
| 3,043,414 | 7/1962 | Peras | 192/67 R |
| 3,249,188 | 5/1966 | Maina | 192/108 |
| 3,348,645 | 10/1967 | Sigg | 192/108 |
| 3,367,462 | 2/1968 | Bibbens | 192/108 |
| 3,894,619 | 7/1975 | Bibbens | 192/67 R X |

FOREIGN PATENT DOCUMENTS

| 1140032 | 11/1962 | Fed. Rep. of Germany | 192/67 R |
|---|---|---|---|
| 3728903 | 11/1988 | Fed. Rep. of Germany | . |
| 360292 | 11/1959 | Switzerland | 192/108 |
| 796847 | 1/1957 | United Kingdom | 192/67 R |
| 996123 | 5/1964 | United Kingdom | 192/67 R |
| 2073337 | 10/1981 | United Kingdom | 192/67 R |

Primary Examiner—Richard M. Lorence
Assistant Examiner—Khoi Q. Ta
Attorney, Agent, or Firm—Evenson, McKeown, Edwards & Lenahan

[57] ABSTRACT

In a shift mechanism of a gearbox, wobbling movements of an idle wheel rotatably mounted on a transmission shaft are suppressed by there being provided in an axial coupling toothing involved in the coupling of the idle wheel to the transmission shaft a tooth pair which comprises two diametrically opposite coupling teeth with respectively leading pitch deviation.

14 Claims, 4 Drawing Sheets

TOOTH PITCH DEVIATION SHIFT MECHANISM FOR A GEARBOX

BACKGROUND AND SUMMARY OF THE INVENTION

The invention relates to a shift mechanism for a motor vehicle gearbox.

In known shift mechanisms, such as those described in German Patent Specification 3,728,903, positive connections between gear wheels and the shafts passing through them are established in order to set up a shifting state. This type of shifting is typical of the shifted transmissions of motor vehicles thereby allowing use of a non-positive synchronizing device, which has the task of matching the speed of the shaft to be coupled to the speed of the gear wheel in engagement.

In a shifting operation, a positive connection is established between a transmission shaft and an idle wheel in engagement. A synchronizing disc is moved along with the idle wheel by a driving cross and, upon meshing of the shift sliding sleeve, establishes a non-positive connection between the latter and the idle wheel. During speed matching, the torque to be transmitted decreases to zero and permits a positive interengaging of shift sliding sleeve and gear wheel.

The positive interengaging is realized by a trapezoidal toothing, the positive profile of which is produced in circle segments laterally on the idle wheel and at the same time is incorporated axially offset in a shift sleeve carrier, which is in firm connection with the shaft. The negative profile for this connection is provided in the inner profile of a shift sliding sleeve and can be pushed over the trapezoidal toothing segments of the idle wheel by axial offsetting.

By this axial offsetting, the positive coupling of the idle wheel with the shift sleeve carrier is brought about. The gripping of the idle wheel by the shift sliding sleeve takes place by means of the coupling toothing which, with the exception of the clearances included for the driving cross described above, has a number of teeth matching the toothed rim of the shift sliding sleeve. These coupling teeth of the toothing segments consequently bring about a positive connection with a statically overdetermined bearing behavior.

Where such shifted transmissions are used in a motor vehicle, frequently a whining gear engaging noise is perceived. This gear whining can be heard distinctly and unpleasantly in the vehicle, causes a considerable impairment in ride comfort. In spite of helical toothing and flank angle correction of the gear wheels used, such cases occur over and over again and in considerable percentages in the series production of shifted transmissions.

The cause is the indeterminate bearing behavior in the coupling toothing, which causes, depending on the variation within the series, an indeterminable pair of teeth for driving and consequently taking over the forces. Since this pair of teeth, determined by the variation within a series, rotates with, the turning of the idle wheel, but the point of force application of the working toothing in the idle wheel remains stationary, there is an interplay between these two forces, which causes a wobbling of the idle wheel. The wobbling of this idle wheel, which is essentially determined in its amplitude by the series-dependent bearing play, causes a cyclical flank angle error in the working toothing, inducing a gear whining noise having an unpleasant effect.

An object of the invention is to avoid the wobbling described here of the idle wheel and the associated disturbing and depreciating noise development in the case of shifted transmissions.

This and other objects are achieved according to an embodiment of the invention in an advantageous way by an idle wheel mounted rotatably and axially undisplaceably on a transmission shaft, on which a coupling ring with an outer axial coupling toothing is arranged coaxially and immovably, a shift sleeve carrier which is arranged immovably on the transmission shaft and has on its outer circumference an outer axial coupling toothing, and an annular shift sliding sleeve, which has on its inner circumference an inner axial coupling toothing corresponding to the outer coupling toothings, in that at least one of the coupling toothings has a tooth pair with two diametrically opposite coupling teeth, each with a pitch deviation leading in the same direction.

An advantage of the invention is that no increased costs are caused in series production. In addition, the invention gives the designer a free hand in designing the shifted transmission with respect to bearing widths of the idle wheel or diameter of the shift sliding sleeve, allowing advantages in reducing the structural form of the gearbox or in eliminating close, and consequently expensive, tolerance limits for the individual components.

The invention consequently relates to the configuration of the trapezoidal coupling toothing of the idle wheel coupling in the shifted transmission. The invention provides a specific configuration of the pitch of this coupling toothing on the idle wheel which ensures that there is always a pair of opposing teeth having the maximum pitch allowance in the pitch diagram and which consequently transform the indeterminate bearing behavior of the driving toothing into a statically determined behavior. A pitch diagram shows the coupling toothing and indicates any deviating from the ideal position in the line on the pitch circle. The coupling toothing expediently has a subdivision into two segments, thereby ensuring a maximum number of pairs of opposite teeth.

In the case of the coupling toothing, this deliberate pitch error according to the invention is produced by the shaping tool which cuts the trapezoidal toothing entering deeper into those tooth gaps which are not intended for assuming the bearing behavior. In the double-segmented coupling toothing, there is further along the trapezoidal toothing a second pair of teeth which can, upon bending of the preceding teeth, then share in taking over the forces after a short bending excursion. In this way it is prevented in particular that, if a torque load is exceeded, a tooth is loaded beyond its bending strength and can thus break off.

The invention has the following effect in the pitch diagram:

In each segment there is a leading pair of teeth, which is produced with phase allowance beyond the distortion to be expected upon hardening, so that it alone can assume force distribution. This pitch configuration can be created in production while the gear wheel is still in the soft state, since although there is still an appreciable distortion of the two segments with respect to each other during hardening, the hardening distortion within a segment may be regarded as minor. The specified amplitude is a value from production experience and does not concern the invention itself. As to the level of pitch lead, it should be noted according to the invention that it must exceed the maximum mispitch of the sliding sleeve involved in the pairing, in spite of hard distortion, in order that the wobble-preventing effect of the teeth with pitch allowance comes to bear in all shift positions.

The other teeth involved in the pitch allowance are not provided with such a great allowance amplitude, but have adequate pitch allowance in order to share proportionately in taking over forces after a small bending excursion without being involved too early in load bearing and consequently disturbing the balancing.

According to an embodiment of the invention, the part of the coupling toothing connected to the gear wheel is provided with a specifically worked pitch pattern, such that in the pitch diagram a pair of opposite teeth have a leading pitch to ensure that the two points of application of the forces for torque transmission are opposite each other, consequently cancel each other out and thus adding no residual force which causes a wobble of the idle wheel.

According to an embodiment of the invention, due to a further pitch pattern, the respectively following teeth are ready to take over the bearing function, consequently, in the event of overloading, a rupture at the root of the first two teeth is prevented by the pitch pattern of the following teeth being kept slightly trailing with respect to the trapezoidal toothing pair intended for bearing, but the following teeth have a lead in the pitch with respect to the rest of the teeth.

According to an embodiment of the invention, the pitch variation for both load directions of a gear wheel is produced in soft working with a basic pitch advance which exceeds the hardening distortion to be expected of the component and consequently ensures effectiveness, irrespective of the variation within the series, but which at the same time is only of such a size that the interval between thrust and pull in the trapezoidal toothing has adequate play in order to ensure smooth shifting of the gearbox and at the same time that the impact upon load changing does not increase unpleasantly after intensive wear.

According to an embodiment of the invention, for wobble-free coupling of the type described here, an even-numbered segment division is to be chosen for the design of the trapezoidal toothing on the idle wheel in order that the trapezoidal toothing has a greater number of opposite teeth.

According to an embodiment of the invention, to avoid wobbling of the subassembly comprising shift sliding sleeve and idle wheel, the same pitch variation is also produced on the coupling toothing of the shift sleeve carrier, which generally does not have any segmenting but has all the teeth incorporated in the outer profile, in such a way that here likewise two teeth are intended for bearing by leading pitch deviation and a number of following teeth are kept ready to take over the force, the basic pitch advance being adapted to correspond to the hardening distortion to be expected in the series production of this component.

Other objects, advantages and novel features of the present invention will become apparent from the following detailed description of the invention when considered in conjunction with the accompanying drawings.

DETAILED DESCRIPTION OF THE DRAWINGS

Figure 1:
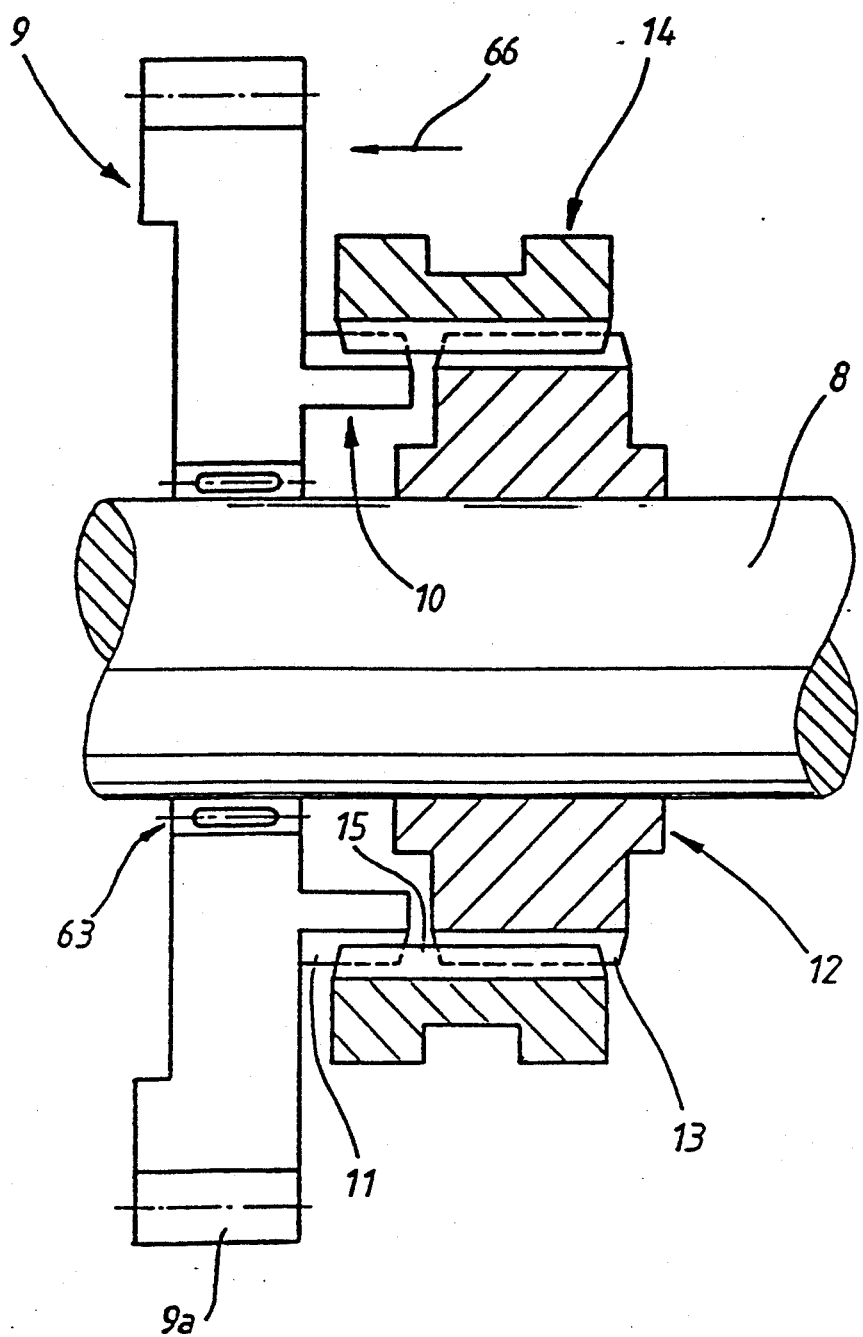
FIG. 1 shows a diagrammatic representation of a shift mechanism according to the invention by means of an axial section.

Referring to FIG. 1, on a transmission shaft 8 of a gearbox (not shown) has a spur gear wheel rotatably mounted as an idle wheel 9 with an intermediate rolling bearing 63. The spur gear wheel is in constant meshing engagement with a further spur gear wheel of a parallel second transmission shaft via its end working toothing 9a. The idle wheel 9 is immovably fixed in the axial direction on the transmission shaft 8 in a manner known to those skilled in the art.

Arranged concentrically and immovably along with the idle wheel 9 on the transmission shaft 8 is an annular shift sleeve carrier 12. The shift sleeve carrier 12 has on the outer circumference a conventional cross-sectionally trapezoidal axial coupling toothing 13.

On an end face facing the shift sleeve carrier 12, the idle wheel 9 has a coaxial coupling ring 10, which is immovable with respect to the idle wheels and is likewise has on the outer circumference an axial coupling toothing 11 with cross-sectionally trapezoidal coupling teeth.

The outer coupling toothings 11 and 13 are used for optional coupling of the idle wheel 9 to the transmission shaft 8 with an intermediate annular shift sliding sleeve 14, which has on the inner circumference an inner axial coupling toothing 15 with cross-sectionally trapezoidal coupling teeth, by which the sleeve 14 engages constantly with the coupling toothing 13. The sleeve 14 is axially displaceable.

Figure 2:
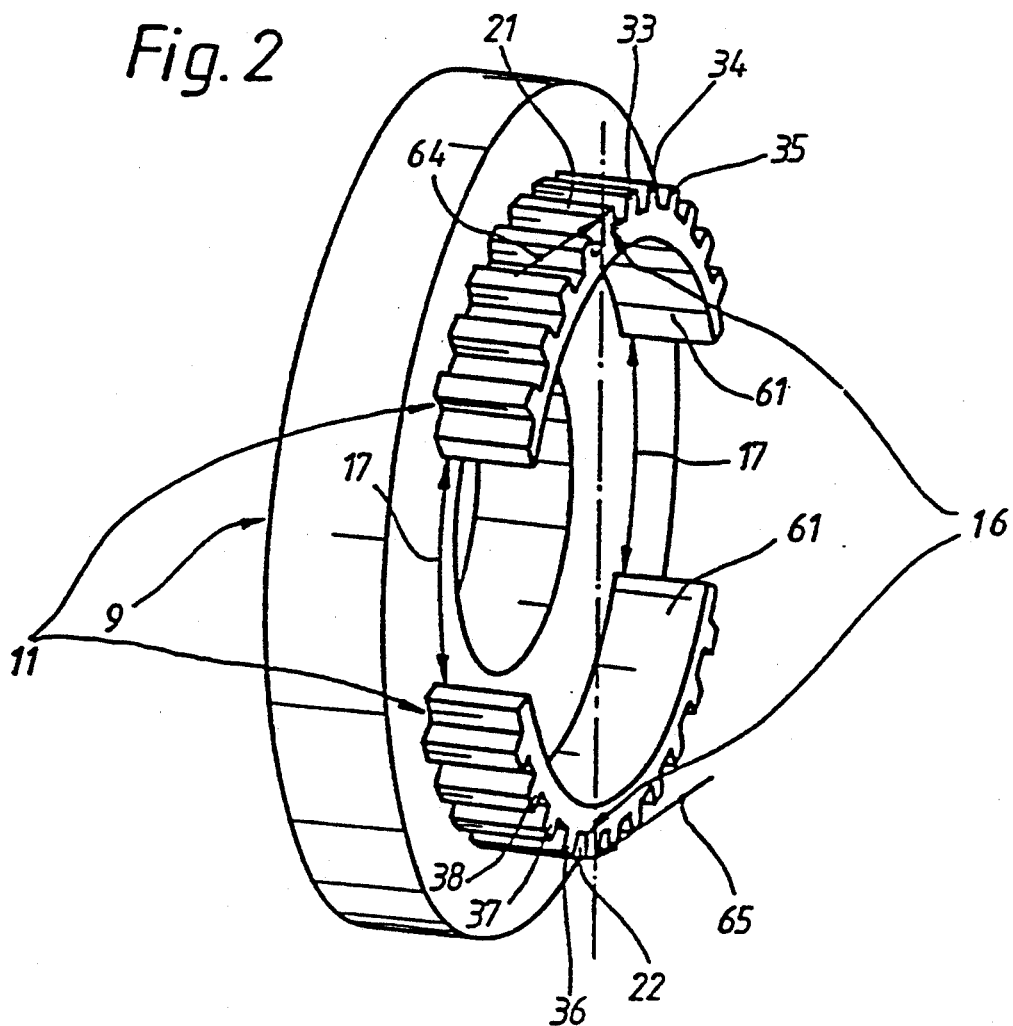
FIG. 2 shows a diagrammatic perspective individual representation of the idle wheel of the shift mechanism of FIG. 1 in a first embodiment.

In a first embodiment of the idle wheel shown in FIG. 2, the coupling ring 11 is subdivided in the circumferential direction into two ring segments 61 by two diametrically opposite clearances 17. These clearances are used in a way which is known to those skilled in the art (not shown) for a limited rotationally movable arrangement of a synchronizing disc on the idle wheel 9. Due to the even number of clearances 17 and annular segments 61, there is a relatively large number of diametrically opposite coupling teeth. This provides the possibility of using a tooth pair 16 in which two coupling teeth 21 and 22, lying respectively at a central circumferential point of the ring segment 61, are provided with a relatively large leading pitch deviation 27 and 28 which eliminates bearing wobbling due to the generation of two mutually canceling forces 64 and 65, when, as shown in FIG. 1, the shift sliding sleeve 14 is inserted in the direction of the arrow 66 into the coupling toothing 11.

Due to the central position of the two coupling teeth 21 and 22, the latter may be adjoined in each case in similar sequence by further coupling teeth 33 to 35 and 36 to 38, respectively, with a respective pitch deviation 47 to 49 and 50 to 52, respectively. The setting here according to FIG. 3, in which the pitch deviation Fp over the rolled-out circumference of the coupling ring 10 is plotted, is arranged such that the pitch deviations 47 to 52 of the further coupling teeth 33 to 38 are both smaller than the respective pitch deviation 27 and 28, respectively, of the two coupling teeth 21 and 22 of the tooth pair 16 and become smaller stage by stage in their sequence.

In this way, upon bending of the preceding coupling teeth, the further coupling teeth 33 to 35 and 36 to 38 share in taking over the forces in pairs after a short bending excursion of the coupling teeth, thus preventing a tooth being loaded beyond its bending strength and can breaking off if a torque load is exceeded.

Figure 3:
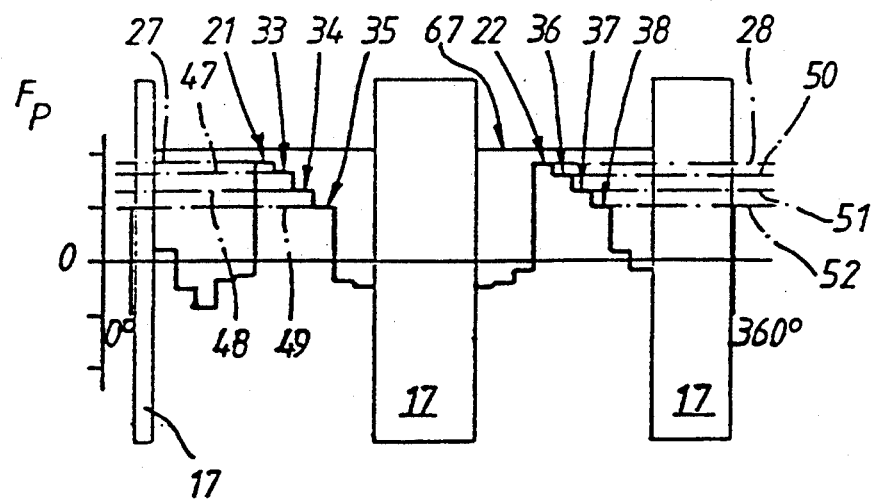
FIG. 3 shows a diagram to represent the pitch deviation in the case of the idle wheel of FIG. 2.

The effect of the invention in the pitch diagram of FIG. 3 is as follows:

The plot for the pitch of the coupling toothing 15 of the shift sliding sleeve 14, which is pushed into the coupling toothing 11 of the idle wheel 9, forms a straight line 67 in the pitch diagram in the case of error-free pitch. This straight line 67 drops, depending on the loading direction, on one side from above towards the tooth flanks and, in the pitch diagram, touches the maximum-leading flank. Upon further turning, the shift sliding sleeve 14 swivels about the point of contact. In the pitch diagram, this produces a sinusoidal line. Since, according to the invention, it is ensured that the second coupling tooth with the greatest leading pitch deviation is opposite the first at 180°, the pair of forces 64, 65 is set up, which provide forces that are balanced so as to avoid bearing wobble.

The hardening distortion of the shift sliding sleeve 14 is generally less than that of the coupling toothing 11 on the idle wheel 9. However, this is not a problem due to dimensional allowances of the tooth pair 16 and the shift sliding sleeve 14.

Figure 4:
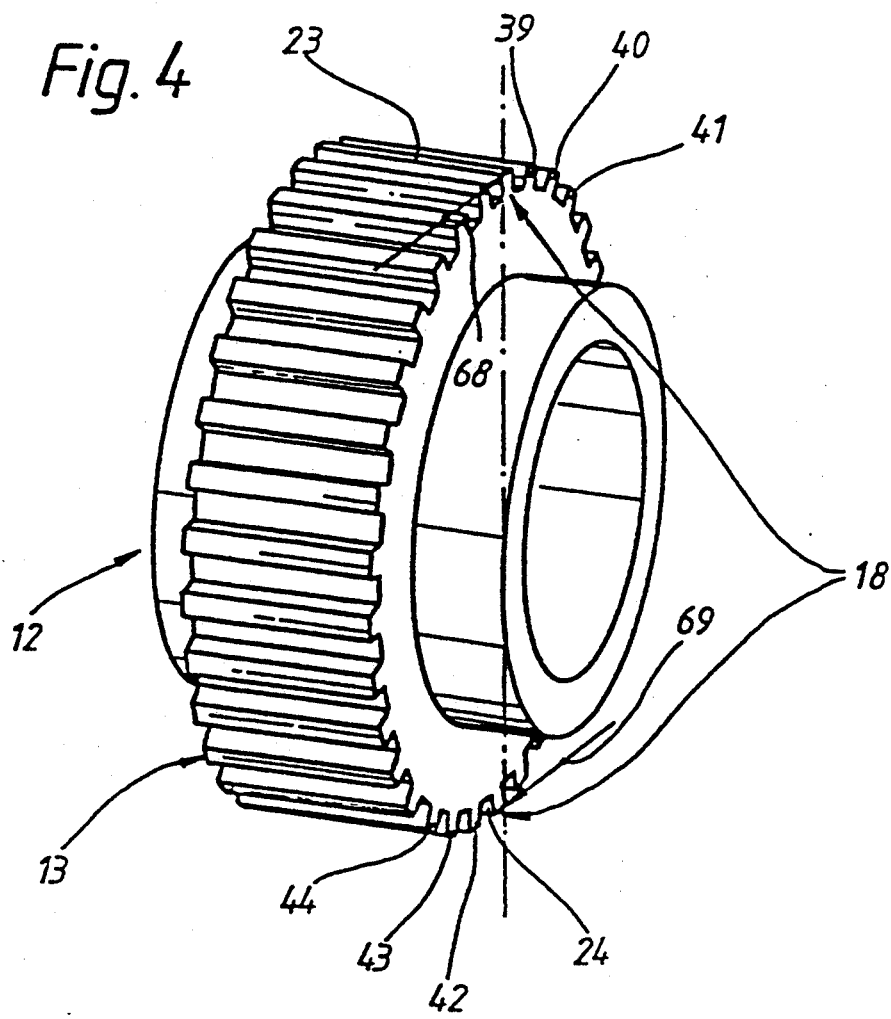
FIG. 4 shows a diagrammatic perspective individual representation of the shift sleeve carrier of the shift mechanism of FIG. 1.
Figure 5:
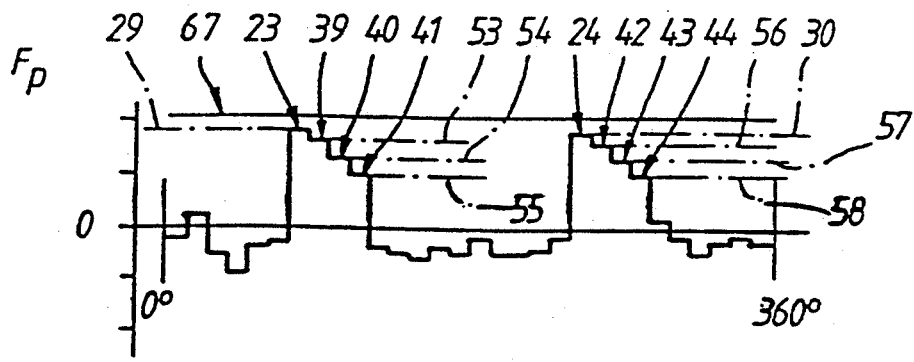
FIG. 5 shows a diagram to represent the pitch deviation in the case of the shift sleeve carrier of FIG. 4.

In FIGS. 4 and 5, circumferentially uninterrupted coupling toothing 13 of the shift sleeve carrier 12 use a tooth pair 18 with two diametrically opposed coupling teeth 23 and 24, which have a maximum leading pitch deviation 29 and 30. The pair 18 generates two mutually canceling tooth forces 68 and 69. Each of the two coupling teeth 23 and 24 is in turn assigned further coupling teeth 39 to 41 and 42 to 44, respectively, with in each case a smaller pitch deviation 53 to 55 and 56 to 58, respectively, decreasing stage by stage in the same given sequence.

In the pitch diagram of FIG. 5 again a straight line 67 is obtained for the error-free pitch of the coupling toothing 15 of the shift sliding sleeve 14.

The coupling toothing 13 of the shift sleeve carrier 12 is, in the normal course of events, statically undetermined, thereby playing a part in causing the wobble of the idle wheel 9 to be avoided by the invention. In this case, idle wheel 9 and shift sliding sleeve 14 rotate as an integral unit with wobble in the coupling toothing 13 of the shift sleeve carrier 12.

Here too, this situation is avoided by the invention. As in the coupling toothing 11 of the idle wheel 9, a tooth pair 18 is intended for bearing, the teeth 23, 24 of which are distinguished by appropriate phase allowance in the pitch diagram.

Since the hardening distortion of the shift sleeve carrier 12 is far less than that of the coupling toothing 11 of the idle wheel 9, the pitch allowance 29 and 30 of the tooth pair 18 can also be made less than in the case of the tooth pair 16 of the idle wheel 9.

In a manner corresponding to that shown for the embodiment of FIGS. 2 and 3, the further coupling teeth 39 to 41 and 42 to 44, respectively, are also ready to share in taking over the forces in the event of bending.

The pairing between shift sleeve carrier 12 and shift sliding sleeve 14 is not renewed each time a gear is selected, as in the case of the idle wheel 9, but is carried out once during assembly. Nevertheless, any pairing is also possible due to the invention and consequently the assembly of these parts is not unnecessarily complicated.

Figure 6:
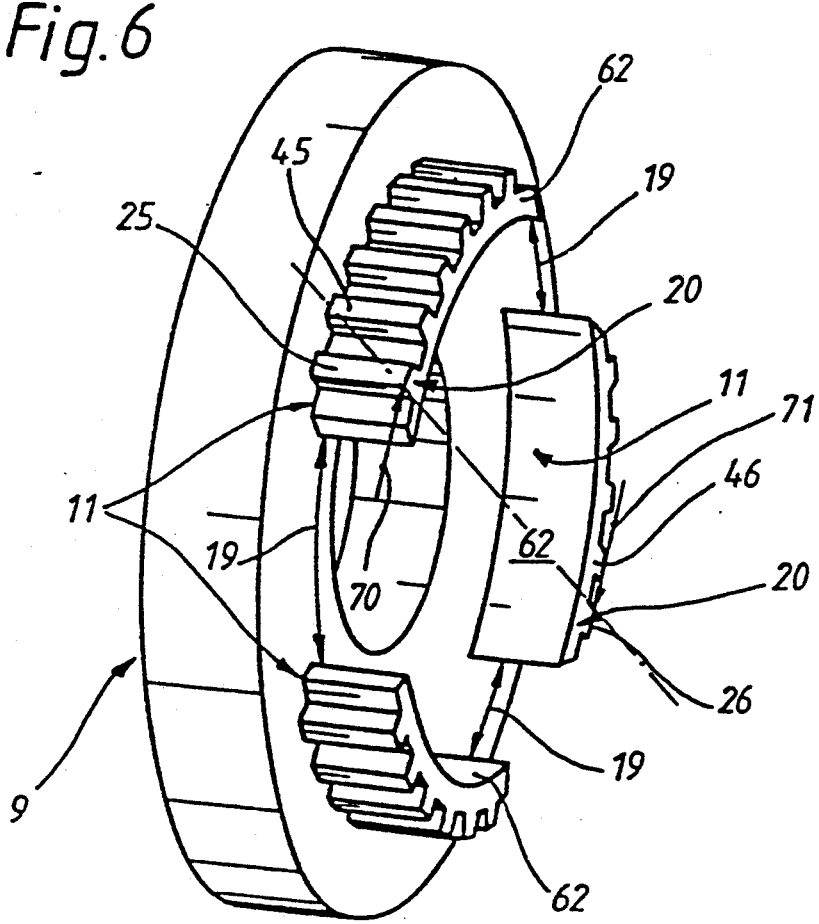
FIG. 6 shows a diagrammatic perspective individual representation of the idle wheel of the shift mechanism of FIG. 1 in a second embodiment.
Figure 7:
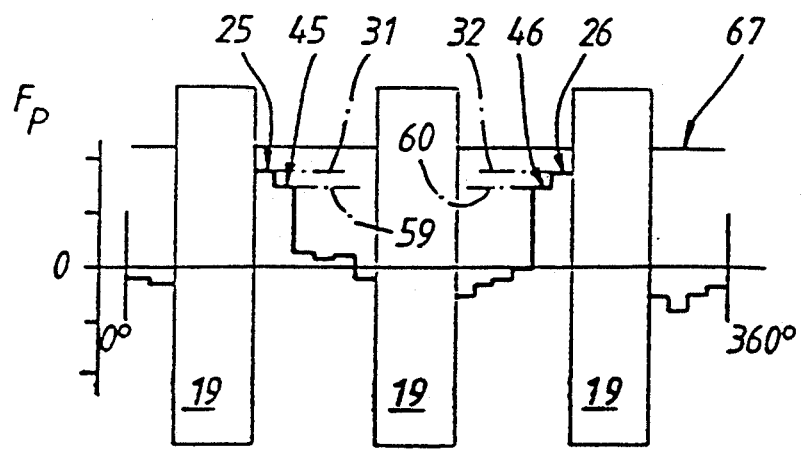
FIG. 7 shows a diagram to represent the pitch deviation in the case of the idle wheel of FIG. 6.

In the case of another embodiment of the idle wheel 9 according to FIGS. 6 and 7, the coupling ring is subdivided in the circumferential direction into three ring segments 62 by three clearances 19. In this embodiment, the choice of positions of the coupling teeth 25 and 26 intended for bearing, than that shown previously. In order to make the opposing position optimal, the coupling tooth 25 lies at the beginning and the coupling tooth 26 lies at the end of their respective ring segments 62. As a result, the teeth 45 and 46 intended for further force takeover are no longer both behind the bearing teeth 25, 26—thus not in the same sequence—but are in each case distributed in the direction of their ring segment 62.

This arrangement—which represents a comprise—can also be seen from the pitch diagram of FIG. 7.

According to FIG. 7, the one coupling tooth 25 with maximum pitch allowance 31 is preceded by a further coupling tooth 45 with less pitch allowance 59, whereas the other coupling tooth 26 with maximum pitch allowance 32 is assigned a following further coupling tooth 46 with less pitch allowance 60.

The error-free pitch of the coupling toothing 15 of the shift sliding sleeve 14 is represented as a straight line 67, whereas the interruptions of the coupling toothing 11 are indicated by the rectangles 19. Otherwise, the operating principle of the teeth 25, 26, 45, 46 with pitch allowance is the same as the operating principle of the tooth pairs 16 and 18 described with reference to FIGS. 3 and 5.

Although the invention has been described and illustrated in detail, it is to be clearly understood that the same is by way of illustration and example, and is not to be taken by way of limitation. The spirit and scope of the present invention are to be limited only by the terms of the appended claims.

What is claimed:

1. Shift mechanism of a gearbox, comprising:
   an idle wheel mounted rotatably and axially immovable on a transmission shaft, having a coupling ring with an outer axial coupling toothing arranged coaxially and immovably,
   a shift sleeve carrier arranged immovably on the transmission shaft and having on the outer circumference an outer axial coupling toothing, and
   an annular shift sliding sleeve, having on the inner circumference an inner axial coupling toothing corresponding to said outer coupling toothings, wherein at least one of either the outer coupling toothings has a tooth pair corresponding to two diametrically opposite coupling teeth having a pitch which deviates substantially from the pitch of other teeth.

2. Shift mechanism according to claim 1, wherein each of said coupling teeth of said tooth pair is assigned at least one other coupling tooth having a leading pitch deviation, and wherein the pitch deviation of said other coupling teeth is less than the respective pitch deviation of said two coupling teeth of said tooth pair.

3. Shift mechanism according to claim 1, wherein said tooth pair having a pitch which deviates substantially from the pitch of other teeth is provided on one or both of the teeth of the outer coupling toothings.

4. Shift mechanism according to claim 1, wherein the coupling ring is subdivided in the circumferential direction into ring segments by clearances.

5. Shift mechanism according to claim 4, wherein the number of ring segments is even and respective further coupling teeth on both teeth of the tooth pair are arranged in a same sequence.

6. Shift mechanism according to claim 4, wherein the number of ring segments is odd and respective further coupling teeth on both teeth of the tooth pair are arranged in a same sequence.

7. Shift mechanism according to claim 1, wherein the cross-section of the coupling teeth is trapezoidal.

8. Shift mechanism according to claim 2, wherein the coupling ring is subdivided in the circumferential direction into ring segments by clearances.

9. Shift mechanism according to claim 3, wherein the coupling ring is subdivided in the circumferential direction into ring segments by clearances.

10. Shift mechanism according to claim 9, wherein the number of ring segments is even and respective further coupling teeth on both teeth of the tooth pair are arranged in a same sequence.

11. Shift mechanism according to claim 9, wherein the number of ring segments is odd and the respective further coupling teeth on both teeth of the tooth pair are arranged in a same sequence.

12. Shift mechanism according to claim 4, wherein the cross-section of the coupling teeth is trapezoidal.

13. Shift mechanism according to claim 10, wherein the cross section of the coupling teeth is trapezoidal.

14. Shift mechanism according to claim 11, wherein the cross-section of the coupling teeth is trapezoidal.

* * * * *